(12) United States Patent
Okano et al.

(10) Patent No.: US 11,765,137 B2
(45) Date of Patent: Sep. 19, 2023

(54) MESSAGE TRANSMISSION SYSTEM, COMMUNICATION TERMINAL, SERVER APPARATUS, MESSAGE TRANSMISSION METHOD, AND PROGRAM

(71) Applicant: NIPPON TELEGRAPH AND TELEPHONE CORPORATION, Chiyoda-ku (JP)

(72) Inventors: Yuki Okano, Musashino (JP); Reo Yoshida, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1134 days.

(21) Appl. No.: 16/468,959

(22) PCT Filed: Dec. 6, 2017

(86) PCT No.: PCT/JP2017/043766
§ 371 (c)(1),
(2) Date: Jun. 12, 2019

(87) PCT Pub. No.: WO2018/116826
PCT Pub. Date: Jun. 28, 2018

(65) Prior Publication Data
US 2020/0084185 A1    Mar. 12, 2020

(30) Foreign Application Priority Data

Dec. 20, 2016  (JP) ................................ 2016-246821

(51) Int. Cl.
*H04L 9/40*    (2022.01)
*G06F 16/953*    (2019.01)
(Continued)

(52) U.S. Cl.
CPC ...... *H04L 63/0428* (2013.01); *G06F 16/9014* (2019.01); *G06F 16/953* (2019.01); *H04L 9/085* (2013.01); *H04L 9/0891* (2013.01)

(58) Field of Classification Search
CPC .... G06F 16/00; G06F 16/9014; G06F 16/953; G09C 1/00; H04L 63/0428; H04L 9/008; H04L 9/085; H04L 9/0891; H04L 9/16
See application file for complete search history.

(56) References Cited

U.S. PATENT DOCUMENTS 9,275,250 B2    3/2016  Yoshino et al.
9,715,546 B1*   7/2017  Mohassel ............. G06F 16/951
(Continued)

FOREIGN PATENT DOCUMENTS

JP    2015-2409 A    1/2015
JP    6038427 B1    12/2016
(Continued)

OTHER PUBLICATIONS

Wang et al., Efficiently Multi-User Searchable Encryption Scheme with Attribute Revocation and Grant for Cloud Storage, Nov. 29, 2016, PLOS ONE, 23 Pages (Year: 2016).*

(Continued)

*Primary Examiner* — Christopher C Harris
(74) *Attorney, Agent, or Firm* — Oblon, McClelland, Maier & Neustadt, L.L.P.

(57) ABSTRACT

The present invention makes it possible to improve confidentiality. A communication terminal stores a session key shared with other communication terminals (S3). The communication terminal makes a pair of an index generated by using the session key for a character string relating to a message and a message identifier, and transmits it to a server apparatus (S4). The server apparatus stores the pair of the index and the message identifier (S5). The communication (Continued)

terminal generates, when the session key is updated, a re-encryption key with a session key before update and a session key after update (S8). The server apparatus updates, by using the re-encryption key, the stored index to an index generated by using the session key after update (S9). The communication terminal encrypts a search keyword with the session key to generate a search query (S10). The server apparatus extracts a message identifier of which the index matches the search query (S11).

9 Claims, 4 Drawing Sheets

(51) Int. Cl.
 *G06F 16/901* (2019.01)
 *H04L 9/08* (2006.01)

(56) References Cited

U.S. PATENT DOCUMENTS

| | | | | |
|---|---|---|---|---|
| 10,237,246 | B1* | 3/2019 | Mulayin | H04L 9/0869 |
| 2008/0123853 | A1* | 5/2008 | Huh | H04L 9/0836 |
| | | | | 380/273 |
| 2009/0300351 | A1* | 12/2009 | Lei | G06F 16/986 |
| | | | | 707/999.005 |
| 2010/0211661 | A1 | 8/2010 | Morimoto et al. | |
| 2011/0249816 | A1 | 10/2011 | Choi et al. | |
| 2012/0078914 | A1* | 3/2012 | Roeder | G06F 16/316 |
| | | | | 707/741 |
| 2015/0143112 | A1* | 5/2015 | Yavuz | G06F 21/6227 |
| | | | | 713/165 |
| 2015/0281184 | A1* | 10/2015 | Cooley | G06F 16/245 |
| | | | | 713/171 |
| 2017/0103228 | A1 | 4/2017 | Yavuz | |
| 2018/0139213 | A1* | 5/2018 | Shin | H04L 51/00 |
| 2018/0144152 | A1* | 5/2018 | Greatwood | G06F 21/602 |
| 2019/0036679 | A1 | 1/2019 | Hirano et al. | |

FOREIGN PATENT DOCUMENTS

| | | |
|---|---|---|
| KR | 10-2011-0113070 A | 10/2011 |
| KR | 10-2013-0056314 A | 5/2013 |
| WO | WO 2009/011120 A1 | 1/2009 |
| WO | WO 2015/187640 A2 | 12/2015 |

OTHER PUBLICATIONS

Miao et al, Revocable and anonymous searchable encryption in multi-user setting, Oct. 7, 2015, Concurrency and Computation: Practice and Experience, 15 Pages (Year: 2015).*

Japanese Office Action dated Mar. 10, 2020 in Patent Application No. 2018-557656 (with English translation), 9 pages.

Extended European Search Report dated May 28, 2020 in Patent Application No. 17884208.4, 10 pages.

Yi-Hui Lin, et al. "A Content Privacy-Preserving Protocol for Energy-Efficient Access to Commercial Online Social Networks" IEEE ICC 2014, XP032632523, Jun. 10, 2014, pp. 688-694.

Sun-Ho Lee, et al. "A Study of Practical Proxy Reencryption with a Keyword Search Scheme Considering Cloud Storage Structure" The Scientific World Journal, vol. 2014, No. ID615679, XP055651747, Feb. 12, 2014, pp. 1-10.

International Search Report dated Mar. 13, 2018, in PCT/JP2017/043766 filed on Dec. 6, 2017.

Masayuki, Y. et al., "Symmetric Searchable Encryption with Key Update Mechanism for Secure Encrypted Database", Official Journal of the Japan Journal of Medical Informatics, vol. 35, Nov. 2015, total 7 pages (with English Abstract).

NTT Software, "Business Group Chat TopicRoom", [online], retrieved on Aug. 16, 2016, Internet <URL:https://www.ntts.co.jp/products/topicroom/index.html> total 5 pages (with partial translation).

Kobayashi, T. et al., "Scalable and Dynamic Multi-Cast Key Distribution", SCIS 2016, 2016 Symposium on Cryptography and Information Security, Kumamoto, Japan, 4E2-3, Jan. 19-22, 2016, pp. 1-7.

Ogata, W. et al., "Toward Practical Searchable Symmetric Encryption", Proceedings of the Advances in Information and Computer Security, Lecture Notes in Computer Science, vol. 8231, 2013, pp. 151-167.

Kita, K. et al., "Information Search Algorithm", Kyoritsu Shuppan Co., Ltd., 2002, total 3 pages (with partial translation).

* cited by examiner

SEARCH TABLE (BEFORE RE-ENCRYPTION)

| $Index_1$ | $ID_{11}, ID_{12}, ...$ |
|---|---|
| $Index_2$ | $ID_{21}, ID_{22}, ...$ |
| $Index_3$ | $ID_{31}, ID_{32}, ...$ |
| ... | ... |

RE-ENCRYPTION

SEARCH TABLE (AFTER RE-ENCRYPTION)

| $Index'_1(=(Index_1)^{RK1,2})$ | $ID_{11}, ID_{12}, ...$ |
|---|---|
| $Index'_2(=(Index_2)^{RK1,2})$ | $ID_{21}, ID_{22}, ...$ |
| $Index'_3(=(Index_3)^{RK1,2})$ | $ID_{31}, ID_{32}, ...$ |
| ... | ... |

FIG. 5

MESSAGE TRANSMISSION SYSTEM, COMMUNICATION TERMINAL, SERVER APPARATUS, MESSAGE TRANSMISSION METHOD, AND PROGRAM

TECHNICAL FIELD

The present invention relates to cryptographic technology, and in particular, a message transmission technique for transmitting and receiving encrypted messages.

BACKGROUND ART

In message transmission systems presupposing use in business, there are message transmission systems that use cloud-based transmission systems so as not to leave data in client terminals in consideration of confidential information leakage on a business enterprise while enabling use of multi-devices such as PCs and smart phones. An example of such cloud-based message transmission systems is a product described in Non-patent literature 1.

In such message transmission systems, eavesdropping on communication paths is prevented by encrypting the communication paths, or as already mentioned, information leakage due to loss or unauthorized removal of terminals is prevented by not leaving data in the terminals. The message transmission systems are prepared for threats to the communication paths and terminals like this, but on the other hand, countermeasures against threats to servers are insufficient. The threats to servers here include attacks from the outside, internal abuse by a server administrator, and the like. Against the threats to servers, there are countermeasures such as storing messages concealed through encryption or the like, but as long as a server side can decrypt them, possibility of message leakage from the servers still remains. Therefore, it is important that messages sent to a server that transmits, receives, and stores messages are kept confidential from the server (server side cannot eavesdrop).

One method is to realize end-to-end encryption communication that conceals messages from the server and allows only terminals to decrypt them, but there is a problem of how to share a common key used between the terminals. As a solution to this problem, for example, Non-patent literature 2 proposes a protocol to share a common key (hereinafter also referred to as a session key) between users without disclosing any information to an authentication server in a star network including the authentication server at its center. This makes it possible to exchange messages between the terminals while concealing the messages from the server.

On the other hand, in view of use in business, a measure for efficiently finding past interactions is necessary. As the measure, a message search function is conceivable. However, because messages stored on a cloud are kept confidential when a session key sharing technique between users is applied, it is necessary to be able to search for messages while they are kept confidential. For example, in Non-patent literature 3, a search key and keyword are input into a hash function, and its output is uploaded as an index to a server. During search, an encrypted keyword generated in a similar procedure is uploaded to the server, which in turn searches for an index having the same hash value, and replies with its result. This makes it possible to search for messages stored on the cloud while they are kept confidential.

PRIOR ART LITERATURE

Non-Patent Literature

Non-patent literature 1: NTT Software "Business Chat Topi-cRoom," [online], [searched on 1 Dec. 2016], Internet <URL: https://www.ntts.co.jp/products/topicroom/index.html>

Non-patent literature 2: Kobayashi, Tetsutaro; Yoneyama, Kazuki; Yoshida, Reo; Kawahara, Yuto; Fuji, Hitoshi; and Yamamoto, Tomohide "Scalable Dynamic Multi-Party Key Distribution Protocol" SCIS2016, 4E2-3, 2016

Non-patent literature 3: W. Ogata, K. Koiwa, A. Kanaoka, S. Matsuo, "Toward Practical Searchable Symmetric Encryption", Proceedings of the Advances in Information and Computer Security, Lecture Notes in Computer Science, Volume 8231, pp. 151-167, 2013.

SUMMARY OF THE INVENTION

Problems to be Solved by the Invention

As described above, sharing a session key between terminals makes it possible to exchange messages while keeping the messages confidential from a server, and makes it possible to search while keeping the messages confidential. However, when it is desired to share the session key only among current participating members like Non-patent literature 2, it is necessary to update the session key when an event such as addition or deletion of a user occurs. At this time, if a search key remains not updated, a deleted user cannot read a message because the user cannot get a session key, but there is a problem related to confidentiality that, by improperly acquiring a search query by which another user asked the server, the user can infer contents of a searched keyword and contents of a message transmitted as a response result by the server.

In view of the above, an objective of the present invention is to provide a message transmission technique capable of improving confidentiality by re-encrypting a search index, when a session key is updated, so as to correspond to a session key after update.

Means to Solve the Problems

In order to solve the above-described problem, a message transmission system of the present invention includes a server apparatus and a plurality of communication terminals, at least one communication terminal receiving a message transmitted by another communication terminal, wherein the plurality of communication terminals include a session key storage configured to store a session key shared with other communication terminals, at least one communication terminal further includes an index generation part configured to make a pair of an index generated by using the session key for a character string relating to the message and a message identifier uniquely identifying the message and transmit the pair to the server apparatus, at least one communication terminal further includes a re-encryption key generation part configured to generate, when the session key is updated, a re-encryption key with a session key before update and a session key after update and transmit the re-encryption key to the server apparatus, at least one communication terminal further includes a query generation part configured to encrypt a search keyword with the session key stored in the session key storage to generate a search query and transmit the search query to the server apparatus, and the server apparatus includes an index storage configured to store the pair of the index and the message identifier received from the communication terminal, a re-encryption part configured to update, by using the re-encryption key received from the communication terminal, the index stored in the index storage to an index generated by using the session key after update for the character string relating to the message, and a search part configured to extract the message identifier of which the index stored in the index storage matches the search query received from the communication terminal and transmit the message identifier to the communication terminal.

Effects of the Invention

According to the message transmission technique of the present invention, because when a session key is updated, a search index is updated so as to correspond to a session key after update, even if a communication terminal that does not know the session key after update acquires a search query, the communication terminal cannot infer contents of a message. Thus, confidentiality improves.

BRIEF DESCRIPTION OF THE DRAWINGS

FIG. 5 is a diagram for illustrating re-encryption of an index.

DETAILED DESCRIPTION OF THE EMBODIMENTS

Figure 1:
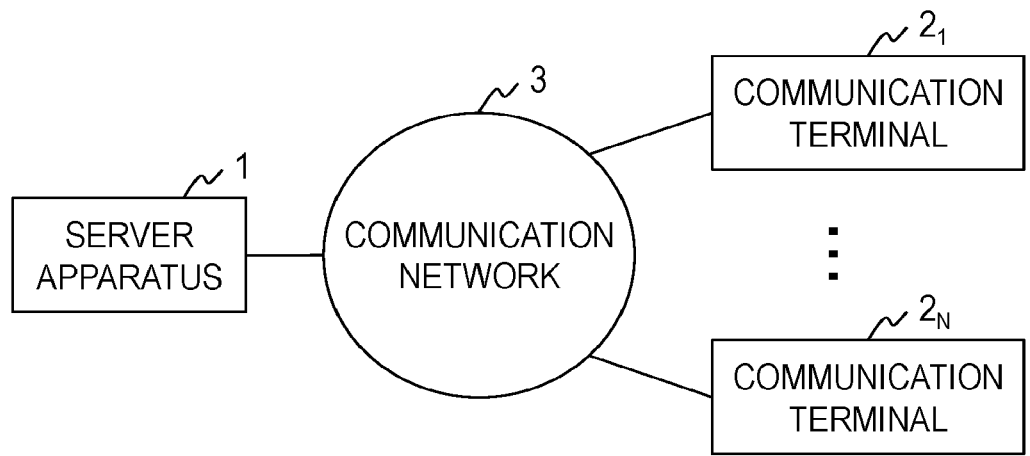
FIG. 1 is a diagram exemplifying a functional configuration of a message transmission system.

Hereinafter, an embodiment of the present invention will be described in detail. Component parts having the same functions in the drawings will be given the same numbers and redundant description will be omitted.

A message transmission technique of the present invention solves the above-described problem in a following manner. When a message is transmitted, a communication terminal side that communicates with a server conceals a keyword in the message with a session key. When the communication terminal updates the session key, the communication terminal generates a re-encryption key for re-encrypting the keyword and transmits the re-encryption key to the server. The server uses the re-encryption key to re-encrypt an index encrypted with the session key before update, and thereby converts the index into an index corresponding to a session key after update while keeping the keyword confidential. As a result, it is possible to transmit a message to the server while a keyword in the message is kept confidential, and by re-encrypting an index when a session key is updated, it is possible to prevent people other than participating users from inferring search contents.

Definitions of symbols used in the following description will be explained. G denotes a cyclic group. As an additive group, there is $G=Z_p$ as a residue class ring of an integer ring modulo a prime number p, and as a multiplicative group, there is $G=Z_p\times$ which is a unit element group of a residue class ring of an integer ring modulo a prime number p. In the following, description is made assuming that G is a multiplicative group. TCRHF is a target collision resistant hash function to output an element of the group G from a character string of arbitrary length as input. Here, the definition of a target collision resistant hash function family will be described. $H=\{H_i: D_i \to R_i\}_i$ denotes a hash function family having a definition domain $D_i$ and a value range $R_i$ for each i. When $x \in D_i$ extracted randomly from the definition domain $D_i$ is given to an arbitrary polynomial time attacker A and an arbitrary suffix i, if it is difficult to find $X' \in D_i$ ($x' \neq x$) that satisfies $H_i(x)=H_i(x')$, H is called a target collision resistant hash function. An example of TCRHF includes TCRHF (x)=SHA256 (x) mod p, where p is a 256-bit prime number and SHA256 is used. However, TCRHF of the invention is not limited to this.

A message transmission system of the embodiment includes a server apparatus 1 and N communication terminals $2_1, \ldots, 2_N$, where $N \geq 2$, as exemplified in FIG. 1. In the embodiment, the server apparatus 1 and the communication terminals $2_1, \ldots, 2_N$ are each connected to a communication network 3. The communication network 3 is a communication network of a circuit switching system or packet switching system configured to be able to mutually communicate among connected devices. It is desirable that the communication network 3 is a closed communication path with secured safety, but it is possible to use an open network, for example, the Internet, as long as measures for securing safety such as individually encrypting communication between devices are taken.

Figure 2:
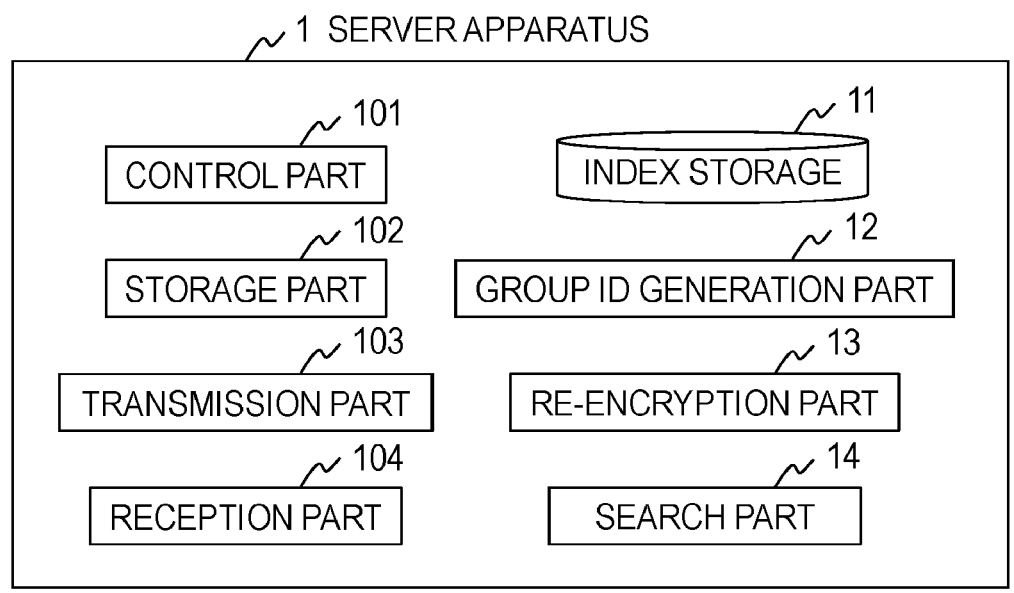
FIG. 2 is a diagram exemplifying a functional configuration of a server apparatus.
Figure 3:
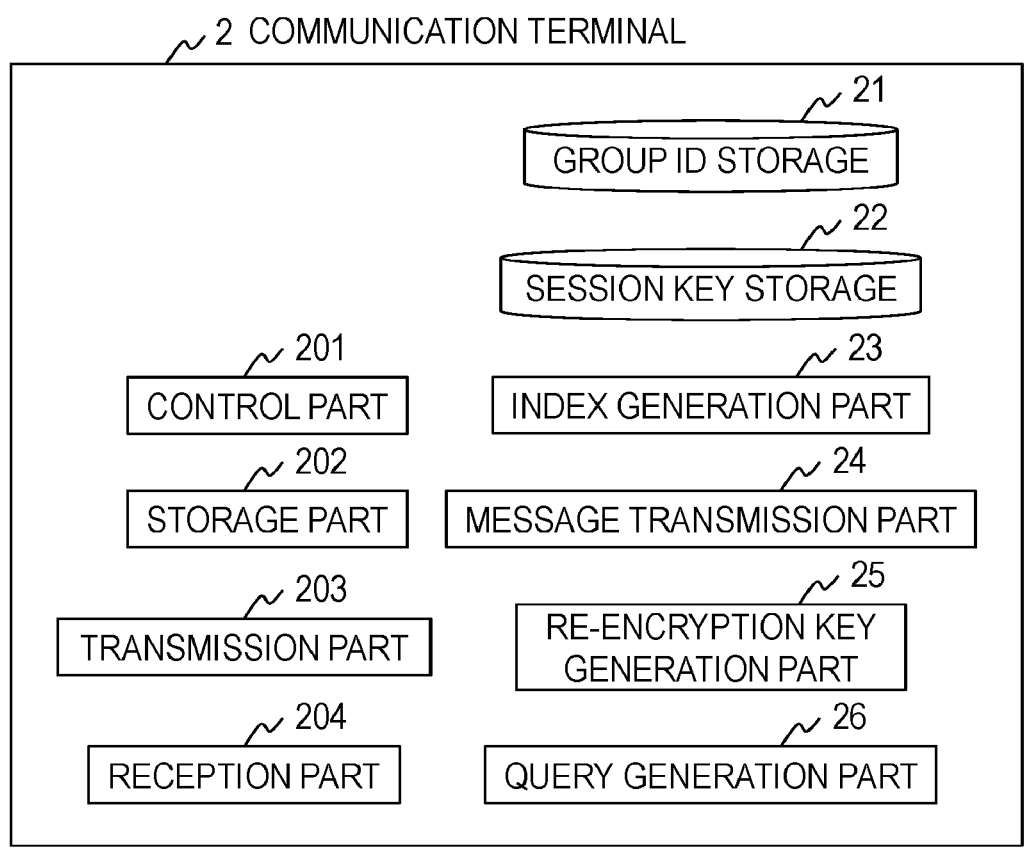
FIG. 3 is a diagram exemplifying a functional configuration of a communication terminal.

The server apparatus 1 includes a control part 101, a storage 102, a transmission part 103, a reception part 104, an index storage 11, a group ID generation part 12, a re-encryption part 13, and a search part 14 as exemplified in FIG. 2. The communication terminals $2_1, \ldots, 2_N$ each include a control part 201, a storage 202, a transmission part 203, a reception part 204, a group ID storage 21, a session key storage 22, an index generation part 23, a message transmission part 24, a re-encryption key generation part 25, and a query generation part 26 as exemplified in FIG. 3. The control parts 101 and 201 are, for example, central processing units (CPUs). The storages 102 and 202 are, for example, main storage devices (RAMs: Random Access Memories). The transmission parts 103 and 203 and the reception parts 104 and 204 are, for example, wired or wireless network interface cards (NICs). The server apparatus 1 and communication terminals $2_1, \ldots, 2_N$ perform processing of steps illustrated in FIG. 4 while mutually communicating and thereby implement a message transmission method of the embodiment.

The server apparatus 1 is a special device that is formed by, for example, causing a known or dedicated computer including a central processing unit (CPU), main storage device (RAM: Random Access Memory), and the like to read a special program. Each device performs processing, for example, under control of the central processing unit. Data input into each device and data obtained by processing are stored in, for example, the main storage device, and the data stored in the main storage device is read out to the central processing unit and used for other processing according to need. At least part of each processing part of each device may be composed of hardware such as an integrated circuit. Each storage of each device can be composed of, for example: a main storage device such as a RAM (Random Access Memory); an auxiliary storage device composed of a hard disc, an optical disk, or a semiconductor memory element like a flash memory; or middle ware such as a relational database or key value store.

Specifically, the communication terminals $2_1, \ldots, 2_N$ are information processing devices such as mobile phones, smart phones, tablet terminals, desktop or laptop personal computers. The terminals are not limited to the specific examples, and may be any information processing devices as long as they can present information to users through sight, hearing, or the like and accept input from the users through screen manipulation, voice input, or the like.

Figure 4:
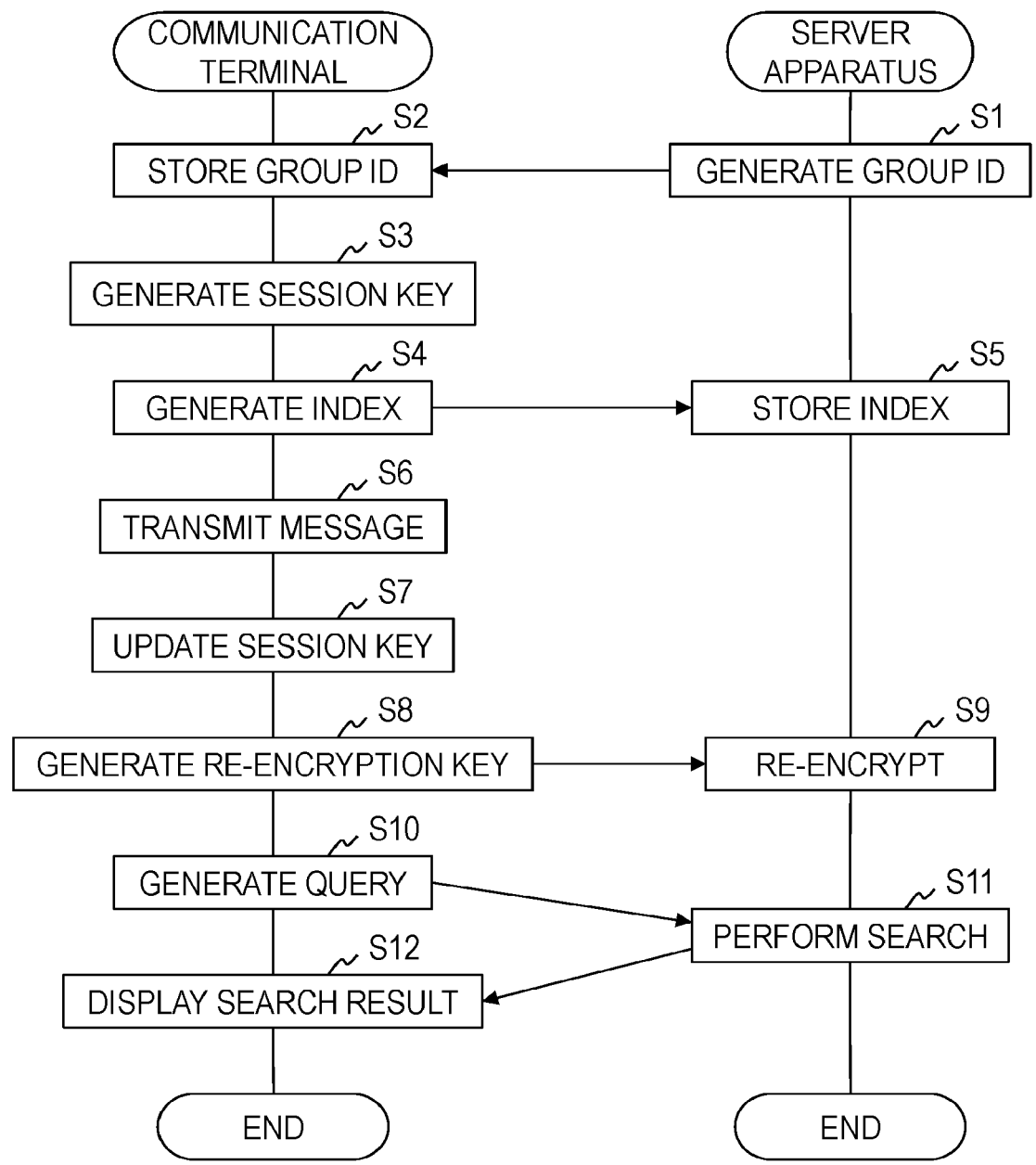
FIG. 4 is a diagram exemplifying a processing procedure of a message transmission method.

Processing procedure of the message transmission method of the embodiment will be described with reference to FIG. 4. In the following description, it is assumed that a communication terminal $2_n$ is any one of the communication terminals $2_1, \ldots, 2_N$, where $n \in \{1, \ldots, N\}$. The message transmission system can form a talk group (hereinafter also simply referred to as a group) made up of a plurality of communication terminals, and allows the communication terminals included in the group to exchange messages with each other.

In step S1, the group ID generation part 12 of the server apparatus 1 generates a group ID uniquely identifying a group including a plurality of communication terminals 2. The generated group ID is transmitted to each of the communication terminals 2 included in the group via the transmission part 103.

In step S2, the communication terminal $2_n$ receives the group ID from the server apparatus 1. The received group ID is stored in the group ID storage 21.

In step S3, the communication terminal $2_n$ shares a session key $SK_1$ with other communication terminals $2_{n'}$ ($n' \neq n$) included in the same group, and stores the session key $SK_1$ in the session key storage 22. Generation and sharing methods of the session key may be performed by using known techniques. It should be noted that the session key $SK_1$ is not known to the server apparatus 1, and is updated to another session key $SK_2$ ($\neq SK_1$) in accordance with occurrence of an event such as addition or deletion of a user in the group or elapse of a certain time.

In step S4, the index generation part 23 of the communication terminal $2_n$ generates an index $Index_k$ by using the session key $SK_1$ stored in the session key storage 22 for a character string $s_k$ relating to a message m to be transmitted to the group. The character k is each integer from 1 to K, and K is the number of character strings relating to the message m. The index $Index_k$ is paired with a message identifier $ID_m$ uniquely identifying the message in, and transmitted to the server apparatus 1 via the transmission part 203. Specifically, the index $Index_k$ is generated as follows. L denotes a searchable character string length. In a case where an upper limit is not provided for the searchable character string length, it is alright to be $L=\infty$, but here L is assumed to be finite ($<\infty$). The identifier $ID_m$ uniquely identifies the message in in the group. Because the message in is kept confidential from the server apparatus 1, it is desirable that a function for generating the identifier $ID_m$ from the message m is one for which it is difficult to calculate an inverse image, that is, the message in cannot be easily inferred from the identifier $ID_m$. It is assumed that a function F is a function that takes as input a character string of arbitrary length and outputs a vector of which a dimension number is dependent on the input character string and in which each component is a character string of the length L or less. Examples of the function F include a function for outputting meta-information on the message in, a function for outputting the character string included in the message in, and a function for outputting all character strings of a consecutive N-character in the message m utilizing N-gram indexing. Details of N-gram indexing are described in Reference literature 1 below.

[Reference literature 1] Kita, Kenji; Tsuda, Kazuhiko; and Shishibori, Masami "Information Retrieval Algorithm" Kyoritsu Syuppan, 2002

The function F will be described below as a function that outputs all consecutive character strings included in the input message m. In order to generate an output character string, the index generation part 23 sets $\lambda = \min\{L, length_m\}$, where $length_m$ denotes character string length of the message m, and performs following operation for each $i=1, \ldots, \lambda$. Consecutive i-character strings in the message m (consecutive character strings in the whole message, consecutive character strings in segments into which the message is sectioned, or the like is conceivable, but not limited to those) are made into $S_1^{(i)}, S_2^{(i)}, \ldots$. Regarding how to assign $S_1^{(i)}, S_2^{(i)}, \ldots$ to character strings, for example, there is a method for setting a consecutive i-character string taken from a left end of the character string as $S_1^{(i)}$, and setting a consecutive i-character string obtained by shifting one from the left end to right as $S_2^{(i)}, \ldots$, but it is not limited to this. The function F obtains the following multi-dimensional vector as an output. That is, $$\frac{\lambda}{2}(2\,length_m - \lambda + 1)$$

dimensional vector $$F(m) = (s_1^{(1)}, s_2^{(1)}, \ldots, s_1^{(2)}, s_2^{(2)}, \ldots, s_j^{(i)}, \ldots, s_{length_m - \lambda + 1}^{(\lambda)},)$$

is obtained.

Next, the function F reads out the session key $SK_1$ stored in the session key storage 22, and calculates the following $index_j^{(i)}$ for each $j=1, 2, \ldots, length_m - \lambda |1$:

$$Index_j^{(i)} = (TCRHF(s_j^{(i)}))^{SK_1},$$

then obtains an index set $$\Lambda = (Index_1^{(1)}, Index_2^{(1)}, \ldots, Index_1^{(2)},$$
$$Index_2^{(2)}, \ldots, Index_j^{(i)}, \ldots, Index_{length_m - \lambda + 1}^{(\lambda)})$$

consisting of $$\frac{\lambda}{2}(2\,length_m - \lambda + 1)$$

$index_j^{(i)}$. At this time of power calculation by the session key $SK_1$, the power calculation may be performed after calculating a remainder by a prime number p of the session key $SK_1$ if necessary. If the group G is an additive group, $SK_1$ times calculation is performed. That is, $$Index_j^{(i)} = SK_1(TCRHF(s_j^{(i)}))$$

is calculated.

For example, if it is supposed that and $L \geq 3$, and m="あいう", then six indexes $$Index_1^{(1)} = (TCRHF(あ))^{SK_1},$$
$$Index_2^{(1)} = (TCRHF(い))^{SK_1},$$
$$Index_3^{(1)} = (TCRHF(う))^{SK_1},$$
$$Index_1^{(2)} = (TCRHF(あい))^{SK_1},$$
$$Index_1^{(2)} = (TCRHF(いう))^{SK_1},$$
$$Index_1^{(3)} = (TCRHF(あいう))^{SK_1},$$

are generated.

Then, a pair of a generated index set Λ and the message identifier $ID_m$ given to the message m $$(\Lambda, ID_m) = (Index_1^{(1)}, Index_2^{(1)}, \ldots, Index_1^{(2)}, Index_2^{(2)}, \ldots, Index_j^{(i)}, \ldots, Index_{length_m - \lambda + 1}^{(\lambda)}, ID_m)$$

is transmitted to the server apparatus 1 via the transmission part 103. At the time of transmission, it is desirable to perform confidential communication like TLS (Transport Layer Security), but there is no limit as to what kind of means to transmit.

In step S5, the server apparatus 1 receives the pair (Λ, $ID_m$) of the index set and message identifier from the communication terminal $2_n$ and stores the pair in the index storage 11. Assuming that identifiers of messages including a keyword $s_k$ are $ID_{k1}, ID_{k2}, \ldots$, it is desirable for efficiency in the index storage 11 that $(Index_k, ID_{k1}, ID_{k2}, \ldots)$ is stored using an index $Index_k$ for the keyword $s_k$ as a key as shown in FIG. 5 but what kind of table is formed is not limited.

In step S6, the message transmission part 24 of the communication terminal $2_n$ encrypts the message m with the session key $SK_1$ stored in the session key storage 22. The encrypted message m has a group ID of a transmission destination specified, and is then transmitted to the server apparatus 1 via the transmission part 203.

In step S7, the communication terminal $2_n$ updates the session key $SK_1$ stored in the session key storage 22 to a new session key $SK_2$. Triggers for updating the session key include occurrence of an event such as addition or deletion of a user in the group or elapse of a certain period of time as described above. However, update of the session key is not limited to those triggers. The session key $SK_2$ after update is stored in the session key storage 22.

In step S8, the re-encryption key generation part 25 of the communication terminal $2_n$ uses, when the session key is updated, the session key $SK_1$ before update and the session key $SK_2$ after update to calculate $$RK_{1,2} = SK_2 / SK_1,$$

thereby generates a re-encryption key $RK_{1,2}$, and transmits it to the server apparatus 1 via the transmission part 203. At the time of transmission, it is desirable to perform confidential communication like TLS, but there is no limit as to what kind of means to transmit.

In step S9, the re-encryption part 13 of the server apparatus 1 receives the re-encryption key $RK_{1,2}$ from the communication terminal $2_n$, performs the following calculation for each index $Index_k$ generated in the group stored in the index storage 11 as shown in FIG. 5, and thereby generates an index $Index'_k$ corresponding to the session key $SK_2$ after update.

$$Index'_k = (Index_k)^{RK_{1,2}}$$

At this time of power calculation by the re-encryption key $RK_{1,2}$, the power calculation may be performed after calculating a remainder by a prime number p of the re-encryption key $RK_{1,2}$ if necessary. When the group G is an additive group, $RK_{1,2}$ times calculation is performed. That is, the following calculation is performed.

$$Index'_k = RK_{1,2}(Index_k)$$

In step S10, the query generation part 26 of the communication terminal $2_n$ encrypts an input search keyword w with the session key $SK_2$ stored in the session key storage 22, thereby generates a search query Query, and transmits it to the server apparatus 1 via the transmission part 203. The query generation part 26 first compares length of a character string of the search keyword w with the searchable character string length L, returns an error if the length of the search keyword w exceeds L, and terminates the processing. If the length of the search keyword w does not exceed L, the query generation part 26 reads out the current session key $SK_2$ from the session key storage 22, calculates the following formula to generate a search query Query, $$Query = (TCRHF(w))^{SK_2}$$

and transmits it to the server apparatus 1 via the transmission part 203. At the time of transmission, it is desirable to perform confidential communication like TLS, but there is no limit as to what kind of means to transmit.

In step S11, the search part 14 of the server apparatus 1 receives the search query Query from the communication terminal $2_n$ and extracts all $(Index'_k, ID_{k1}, ID_{k2}, \ldots)$ that satisfy $Index'_k = Query$ among pairs $(Index'_k, ID_{k1}, ID_{k2}, \ldots)$ of the index and the message identifiers stored in the index storage 11. The extracted message identifiers $ID_{k1}, ID_{k2}, \ldots$ are transmitted via the transmission part 103 to the communication terminal $2_n$ that has transmitted the search query Query. At the time of transmission, it is desirable to perform confidential communication like TLS, but there is no limit as to what kind of means to transmit.

In step S12, on receiving the message identifier $ID_m$ as a search result for the search query Query, the communication terminal $2_n$ obtains the encrypted message m corresponding to the message identifier $ID_m$, and displays it as the search result on an output part such as a screen. As a display method, for example, it is conceivable to display a list of messages m, which is a search result, by highlighting the search keyword w in the messages, but it is not limited thereto.

In the above description, it is explained as a configuration in which one communication terminal $2_n$ performs all from generation of an index to generation of a search query, but it is also possible to mix a communication terminal configured to only generate an index, a communication terminal configured to only generate a re-encryption key, and a communication terminal configured to only generate a search query. For example, if a communication terminal only generates an index, it is sufficient to include only the control part 201, storage 202, transmission part 203, reception part 204, group ID storage 21, session key storage 22, index generation part 23, and message transmission part 24. In addition, for example, if a communication terminal only generates an re-encryption key, it is sufficient to include only the control part 201, storage 202, transmission part 203, reception part 204, group ID storage 21, session key storage 22, and re-encryption key generation part 25. Furthermore, for example, if a communication terminal only generates a search query, it is sufficient to include only the control part 201, storage 202, transmission part 203, reception part 204, group ID storage 21, session key storage 22, and query generation part 26.

According to the message transmission technique of the invention, by configuring like the above, it is possible to update an index obtained by encrypting a character string relating to a transmitted message to an index corresponding to a session key after update while keeping an original character string confidential when a session key is updated. Therefore, even if a search query transmitted by a user is improperly acquired or the like, contents of a transmitted message cannot be inferred from a searched keyword or search result. According to the present invention, it is possible to improve confidentiality of the message transmission technique.

Although the embodiment of the present invention has been described above, specific configurations are not limited to the embodiment, it goes without saying that the invention includes modifications or the like if design changes and the like are appropriately made within a range not departing from the spirit of the invention. The various processes described in the embodiment may be executed not only in chronological order according to the described order but also in parallel or individually in accordance with processing capability of a device that executes the processes or needs.

[Program and Recording Medium]

When a computer implements various processing functions of each device described in the above embodiment, processing contents of functions that each device should have are written by a program. Then, the computer executes the program and thereby implements the various processing functions of each device.

The program describing the processing contents can be recorded on a computer-readable recording medium. The computer-readable recording medium may be any of, for example, a magnetic recording device, an optical disk, a magneto-optical recording medium, and a semiconductor memory.

Distribution of the program is carried out, for example, by selling, transferring, and renting a portable recording medium, such as a DVD or CD-ROM, on which the program is recorded. Furthermore, the program may be stored in a storage device of a server computer and distributed by transferring the program from the server computer to another computer via a network.

A computer that executes such a program first stores, for example, the program recorded in the portable recording medium or transferred from the server computer in its own storage device. Then, at the start of processing, the computer reads the program stored in its own recording medium and performs processing according to the read program. As another execution format of the program, the computer may directly read the program from the portable recording medium and perform the processing according to the program, or may sequentially perform processing according to a program received whenever the program is transferred from the server computer to the computer. In addition, the server computer does not transfer the program to the computer, but by a so-called ASP (Application Service Provider) type service to implement processing functions only by execution instructions and result acquisition, the above-described processing may be performed. The program in the embodiment includes information that is used for processing by an electronic computer and conforms to a program (data or the like that is not a direct command to the computer but has a property to define processing of the computer).

In the embodiment, although the device is configured by executing the prescribed program on the computer, at least part of the processing contents may be performed by hardware.

What is claimed is:

1. A message transmission system including a server apparatus and a plurality of communication terminals, at least one communication terminal receiving a message transmitted by another communication terminal, wherein:

the plurality of communication terminals include processing circuitry configured to:

store a session key shared with other communication terminals in a session key storage;

at least one of the processing circuitry of the communication terminals further configured to:

make a pair of an index generated by using the session key for a character string derived from the message and a message identifier uniquely identifying the message, and transmit the pair to the server apparatus;

at least one of the processing circuitry of the communication terminals further includes configured to:

generate, when the session key is updated, a re-encryption key with the previously stored session key before update and a session key after update, and transmit the re-encryption key to the server apparatus;

at least one of the processing circuitry of the communication terminals further includes configured to:

encrypt a search keyword with the current session key stored in the session key storage to generate a search query, and transmit the search query to the server apparatus; and the server apparatus includes processing circuitry configured to:

store the pair of the index and the message identifier received from the communication terminal;

update, by using the re-encryption key received from the communication terminal, the index stored in the index storage to an index generated by using the session key after update for the character string relating to the message; and extract the message identifier of which the current index stored in the index storage matches the search query received from the communication terminal, and transmit the message identifier to the communication terminal.

2. The message transmission system according to claim 1, wherein the processing circuitry of the communication terminals generates the index by using the session key and a target collision resistant hash function for an arbitrary character string included in the message or each segment included in the message.

3. The message transmission system according to claim 1 or 2, wherein assuming that G is a multiplicative group, TCRHF is a target collision resistant hash function that outputs an element of the group G from a character string of arbitrary length as input, $SK_1$ is the session key before update, $SK_2$ is the session key after update, $RK_{1,2}$ is the re-encryption key, K is a number of character strings relating to the message, k is each integer from 1 to K, $s_k$ is a character string relating to the message, $Index_k$ is an index before update, $Index'_k$ is an index after update, w is the search keyword, and Query is the search query, the processing circuitry of the communication terminal generates the index by a next formula:

$$Index_k = (TCRHF(s_k))^{SK_1};$$

the processing circuitry of the communication terminals generates the re-encryption key by a next formula:

$$RK_{1,2} = SK_2/SK_1;$$

the processing circuitry of the server apparatus updates the index by a next formula:

$$Index'_k = (Index_k)^{RK_{1,2}};$$ and the processing circuitry of the communication terminals generates the search query by a next formula:

$$Query = (TCRHF(w))^{SK_2}.$$

4. The message transmission system according to claim 1 or 2, wherein
   assuming that G is an additive group, TCRHF is a target collision resistant hash function that outputs an element of the group G from a character string of arbitrary length as input, $SK_1$ is the session key before update, $SK_2$ is the session key after update, $RK_{1,2}$ is the re-encryption key, K is a number of character strings relating to the message, k is each integer from 1 to K, $s_k$ is a character string relating to the message, $Index_k$ is an index before update, $Index'_k$ is an index after update, w is the search keyword, and Query is the search query,
   the processing circuitry of the communication terminals generates the index by a next formula:

$Index_k = SK_1(TCRHF(s_k))$;

the processing circuitry of the communication terminals generates the re-encryption key by a next formula:

$RK_{1,2} = SK_2/SK_1$;

the processing circuitry of the server apparatus updates the index by a next formula:

$Index'_k = RK_{1,2}(Index_k)$; and the processing circuitry of the communication terminals generates the search query by a next formula:

$Query = SK_2(TCRHF(w))$.

5. A communication terminal used in a message transmission system including a server apparatus and a plurality of communication terminals, at least one communication terminal receiving a message transmitted by another communication terminal, wherein:
   the communication terminal includes processing circuitry configured to:
     store a session key shared with other communication terminals in a session key storage;
     make a pair of an index generated by using the session key for a character string derived from the message and a message identifier uniquely identifying the message, and transmit the pair to the server apparatus;
     generate, when the session key is updated, a re-encryption key with the previously stored session key before update and a session key after update, and transmit the re-encryption key to the server apparatus; and
     encrypt a search keyword with the current session key stored in the session key storage to generate a search query, and transmit the search query to the server apparatus,
   wherein the transmission of (i) the pair of the index and the message identifier, (ii) the re-encryption key, and (iii) the search query to the server apparatus causes the server apparatus to:
     store the pair of the index and the message identifier received from the communication terminal;
     update, by using the re-encryption key received from the communication terminal, the index stored in the index storage to an index generated by using the session key after update for the character string relating to the message; and
     extract the message identifier of which the current index stored in the index storage matches the search query received from the communication terminal, and transmit the message identifier to the communication terminal.

6. A server apparatus used in a message transmission system including the server apparatus and a plurality of communication terminals, at least one communication terminal receiving a message transmitted by another communication terminal, wherein:
   the server apparatus includes processing circuitry configured to:
     store the pair of an index and a message identifier received from the communication terminal in the index storage, wherein the pair of the index is generated by the communication terminal by using a stored session key for a character string derived from the message and the message identifier generated by the communication terminal uniquely identifies the message;
     update, by using a re-encryption key received from the communication terminal, the index stored in the index storage to an index generated by using the session key after update for a character string derived from the message, wherein the re-encryption key is generated by the communication terminal when the session key is updated with the previously stored session key before update and a session key after update; and
     extract the message identifier of which the current index stored in the index storage matches a search query received from the communication terminal, and transmit the message identifier to the communication terminal, wherein a search keyword was encrypted by the communication terminal with the current session key stored in the session key storage to generate the search query.

7. A message transmission method for receiving, by at least one other communication terminal, a message transmitted by a communication terminal in a message transmission system including a server apparatus and a plurality of communication terminals, the message transmission method comprising:
   storing, by the communication terminal, a session key shared with other communication terminals in a session key storage;
   making, by the communication terminal, a pair of an index generated by using the session key for a character string derived from the message and a message identifier uniquely identifying the message, and transmitting the pair to the server apparatus;
   storing, by the server apparatus, the pair of the index and the message identifier received from the communication terminal in an index storage;
   generating, by the communication terminal when the session key is updated, a re-encryption key with the previously stored session key before update and a session key after update, and transmitting the re-encryption key to the server apparatus;
   updating, by the server apparatus, by using the re-encryption key received from the communication terminal, the index stored in the index storage to an index generated by using the session key after update for the character string derived from the message;
   encrypting, by the communication terminal, a search keyword with the current session key stored in the session key storage to generate a search query, and transmitting the search query to the server apparatus; and
   extracting, by the server apparatus, the message identifier of which the current index stored in the index storage matches the search query received from the communication terminal, and transmitting the message identifier to the communication terminal.

8. A non-transitory computer readable medium including computer executable instructions that make a communication terminal used in a message transmission system including a server apparatus and a plurality of communication terminals, at least one communication terminal receiving a message transmitted by another communication terminal, the communication terminal performs a method comprising:

storing a session key shared with other communication terminals in the session key storage;

making a pair of an index generated by using the session key for a character string derived from the message and a message identifier uniquely identifying the message, and transmitting the pair to the server apparatus;

generating, when the session key is updated, a re-encryption key with the previously stored session key before update and a session key after update, and transmitting the re-encryption key to the server apparatus; and encrypting a search keyword with the current session key stored in the session key storage to generate a search query, and transmitting the search query to the server apparatus, wherein the transmission of (i) the pair of the index and the message identifier, (ii) the re-encryption key, and (iii) the search query to the server apparatus causes the server apparatus to:

store the pair of the index and the message identifier received from the communication terminal;

update, by using the re-encryption key received from the communication terminal, the index stored in the index storage to an index generated by using the session key after update for the character string relating to the message; and extract the message identifier of which the current index stored in the index storage matches the search query received from the communication terminal, and transmit the message identifier to the communication terminal.

9. A non-transitory computer readable medium including computer executable instructions that make a server apparatus used in a message transmission system including the server apparatus and a plurality of communication terminals, at least one communication terminal receiving a message transmitted by another communication terminal, the server apparatus performs a method comprising:

storing the pair of an index and a message identifier received from the communication terminal in the index storage, wherein the pair of the index is generated by the communication terminal by using a stored session key for a character string derived from the message and the message identifier generated by the communication terminal uniquely identifies the message;

updating, by using the re-encryption key received from the communication terminal, the index stored in the index storage to an index generated by using the session key after update for a character string to derived from the message, wherein the re-encryption key is generated by the communication terminal when the session key is updated with the previously stored session key before update and a session key after update; and extracting the message identifier of which a current index stored in the index storage matches the search query received from the communication terminal, and transmitting the message identifier to the communication terminal, wherein a search keyword was encrypted by the communication terminal with the current session key stored in the session key storage to generate the search query.

* * * * *

UNITED STATES PATENT AND TRADEMARK OFFICE
CERTIFICATE OF CORRECTION

| | |
|---|---|
| PATENT NO. | : 11,765,137 B2 |
| APPLICATION NO. | : 16/468959 |
| DATED | : September 19, 2023 |
| INVENTOR(S) | : Yuki Okano et al. |

It is certified that error appears in the above-identified patent and that said Letters Patent is hereby corrected as shown below:

In the Claims

Column 14, Line 21, "session key after update for a character string to derived" should be changed to -- session key after update for a character string derived --.

Signed and Sealed this
Twenty-second Day of October, 2024

Katherine Kelly Vidal
*Director of the United States Patent and Trademark Office*